United States Patent [19]

Genz et al.

[11] Patent Number: 5,149,725
[45] Date of Patent: Sep. 22, 1992

[54] FLEXIBLE POLYURETHANE FOAMS WITH REDUCED DRIPPING DURING BURNING

[75] Inventors: Manfred Genz, Damme, Fed. Rep. of Germany; Andreas Rothacker, Sterling Heights, Mich.

[73] Assignee: BASF Corporation, Parsippany, N.J.

[21] Appl. No.: 796,966

[22] Filed: Nov. 25, 1991

[51] Int. Cl.⁵ .............................................. C08J 9/00
[52] U.S. Cl. ..................................... 521/110; 521/99; 521/907
[58] Field of Search ........................ 521/110, 99, 907

[56] References Cited

U.S. PATENT DOCUMENTS

| | | | |
|---|---|---|---|
| 4,039,490 | 8/1977 | Kanner | 260/254 |
| 4,251,635 | 2/1981 | Stone | 521/113 |
| 4,367,291 | 1/1983 | Baskent et al. | 521/112 |
| 4,458,036 | 7/1984 | Fesman | 521/107 |
| 4,746,683 | 5/1988 | Kilgour | 521/112 |
| 4,769,174 | 9/1988 | Kilgour | 252/351 |
| 4,785,067 | 11/1988 | Brumbill | 528/26 |
| 4,797,445 | 1/1989 | Piskoti | 524/477 |
| 4,797,501 | 1/1989 | Myerly et al. | 556/445 |
| 4,902,767 | 2/1990 | Roitman et al. | 528/28 |
| 5,034,445 | 7/1991 | Kendall et al. | 524/265 |

Primary Examiner—Morton Foelak
Attorney, Agent, or Firm—Dennis V. Carmen

[57] ABSTRACT

The invention pertains to drip retardant flexible polyurethane foams prepared by the reaction of an isocyanate with a polyol resin containing a drip retardant made of either a trialkyl end-capped amine functional silicone polymer or a trialkyl end-capped carbinol functional silicone polymer to effectively prevent the foam from dripping while burning and encourage char formation.

7 Claims, No Drawings

FLEXIBLE POLYURETHANE FOAMS WITH REDUCED DRIPPING DURING BURNING

BACKGROUND OF THE INVENTION

1. Field of the Invention

The present invention is directed to a flexible polyurethane foam which does not drip while burning. More particularly, the drip-free flexible polyurethane foam of the invention contains a polyamine functional silicone polymer or an active polyhydroxyl functional silicone copolymer in exceptionally small amounts to effectively prevent the flexible foam from dripping while burning.

2. Description of the Related Art

Flexible polyurethane foams have a wide variety of applications, from seat cushions in aircraft, automobiles, and furniture to carpet underlay, dashboards, headrests, and packaging materials. However, polyurethane flexible foams are plagued with flammability problems, leading to the melting and spreading of burning foam through molten or flaming droplets. The molten or flaming foam dripping from the original mass not only can cause the remaining unburnt foam to smolder, but also presents a risk of smoldering or igniting encasements or objects in the nearby vicinity.

Flame retardants do not solve, and often exacerbate, the problem of smoldering and dripping. Some flame retardants encourage the formation of drip to quickly remove the burning mass from the unburnt mass, thereby quickly extinguishing the flame. For many applications, however, there exists a need to contain and localize the burning mass rather than allow flaming or molten drippings to spread and thereby risk smoldering and igniting other nearby flammable objects.

SUMMARY OF THE INVENTION

It has been discovered that by incorporating specific additives into a flexible polyurethane foam, dripping action during burn is substantially eliminated. The additives useful in a flexible polyurethane foam effective as drip preventatives are specific trialkyl end-capped amine functional silicone polymers or specific trialkyl end-capped active carbinol functional silicone copolymers added to the polyol composition in an amount from about 5 weight percent or less, preferably about 1 weight percent.

DETAILED DESCRIPTION OF THE INVENTION

It has been unexpectedly found that small amounts of a trimethyl end capped polyamine functional silicone polymer or a trimethyl end capped active polycarbinol functional silicone polymer can be utilized as an additive in flexible polyurethane foams to eliminate dripping during burn. It has been found that incorporating these specific silicone polymers in an amount ranging from 0.5 to 5 parts by weight of the polyol resin enables the preparation of a polyurethane foam exhibiting substantially reduced dripping, and in most cases, eliminates dripping during burn.

The flexible foams of this invention are defined as those having a tensile to compressive strength ratio at 25% deflection of from 15 to 70:1, high elongation, fast recovery rate, and a high elastic limit. Rigid foams, on the other hand, have a low tensile to compressive strength ratio, a low elongation less than 10%, a low recovery rate from distortion and a low elastic limit.

The trialkyl (or triaryl) end-capped polyamine and polycarbinol silicone polymers utilized as a drip retardant in the flexible polyurethane foams of the present invention have the following general formula:

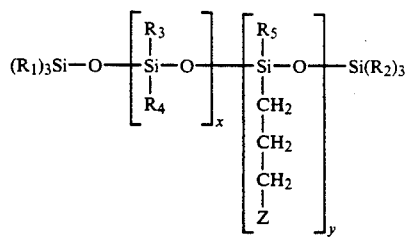

wherein $R_1$, $R_2$, $R_2$, $R_3$, $R_4$, and $R_5$ are each selected from the group consisting of alkyl radicals having 1-4 carbon atoms and aryl radicals; Z is selected from the group consisting of OH and $NH_2$; x ranges from 10 to 200, preferably 20 to 125; y ranges from 2 to 50, preferably 2 to 10, when Z is $NH_2$; and y ranges from 2 to 50, preferably 4-20, when Z is OH. The x and y designations in the formulas throughout the specification merely represent the number of units making up the polymer rather than a limitation on the arrangement or sequence of the units. Thus, the units can be arranged as blocks or divided and/or distributed in the order appearing in the formulas or randomly. As the alkyl group, methyl is preferred, and as the aryl group, phenyl is preferred. Each of the R groups can be different or identical to each other, and contain different or identical radicals within each group. Preferably, all R groups are methyl.

Specific examples of polyamine silicone polymers are GP-4 silicone fluid commercially available from Genesee Polymers Corporation, Flint, Mich., having the following formula:

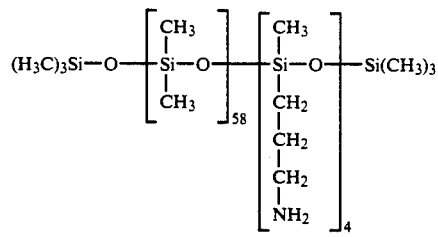

Another example of a polyamine silicone polymer utilized in the flexible polyurethane foam of the present invention is GP-6 also sold by Genesee Polymers Corporation of Flint, Mich., having the following formula:

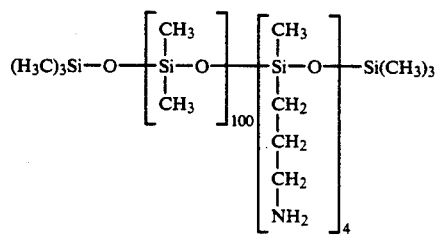

A specific example of a polycarbinol functional silicone polymer is EXP-68 commercially available from Genesee Polymers Corporation having the following formula:

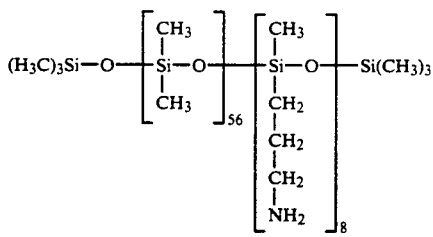

The numbers of repeating units in the above formulas represent average values. The amount of polyamine silicone polymer or polycarbinol silicone polymer set forth in formula I used in the flexible polyurethane foam of the invention ranges from 0.5 to 5 weight percent of the polyol composition. Although greater than 5 weight percent can be incorporated in the polyol composition, no increase in melt viscosity or char formation can be noticed, rendering an excess commercially disadvantageous. The amount of these silicone polymers were surprisingly effective in quantities as small as less than or equal to 1 weight percent based on the polyol composition, to eliminate or substantially reduce the dripping action of the flexible polyurethane during a burn. Thus, a preferable amount of these silicone polymers in the foam ranges from about 0.5 to about 1.5 weight percent, more preferably from about 0.5 to about 1 weight percent based on the polyol composition.

The polyol composition of the invention comprises a polyol, a drip retardant, a blowing agent, a urethane forming catalyst, and optionally chain extending agents, surface active agents, stabilizers, dyes, fillers, pigments and flame retardants.

Representative polyols which may be employed in the invention are well know to those skilled in the art. They are often prepared by the catalytic condensation of an alkylene oxide or mixture of alkylene oxides, either simultaneously or sequentially, with an organic compound having at least two active hydrogen atoms, such as evidenced by U.S. Pat. Nos. 1,922,459; 3,190,927; and 3,346,557. Representative polyols include polyhydroxyl-containing polyesters, polyoxyalkylene polyether polyols, polyhydroxy-terminated polyurethane polymers, polyhydroxyl-containing phosphorus compounds, and alkylene oxide adducts of polyhydric polythioesters, polyacetals, aliphatic polyols and thiols, ammonia, and amines including aromatic, aliphatic, and heterocyclic amines, as well as mixtures thereof. Alkylene oxide adducts of compounds which contain two or more different groups within the above-defined classes may also be used, for example, amino alcohols which contain an amino group and a hydroxyl group. Also, alkylene oxide adducts of compounds which contain one SH group and one OH group as well as those which contain an amino group and an SH group may be used. Generally, the equivalent weight of the polyols will vary from 500 to 10,000, preferably from 750 to 3000.

Any suitable hydroxy-terminated polyester may be used such as are prepared, for example, from polycarboxylic acids and polyhydric alcohols. Any suitable polycarboxylic acid may be used such as oxalic acid, malonic acid, succinic acid, glutaric acid, adipic acid, pimelic acid, suberic acid, azelaic acid, sebacic acid, brassylic acid, thapsic acid, maleic acid, fumaric acid, glutaconic acid, α-hydromuconic acid, β-hydromuconic acid, α-butyl-α-ethyl-glutaric acid, α,β-diethylsuccinic acid, isophthalic acid, terephthalic acid, hemimellitic acid, and 1,4-cyclohexanedicarboxylic acid. Any suitable polyhydric alcohol, including both aliphatic and aromatic, may be used such as ethylene glycol, propylene glycol, trimethylene glycol, 1,2-butanediol, 1,3-butanediol, 1,4-butanediol, 1,2-pentanediol, 1,4-pentanediol, 1,5-pentanediol, 1,6-hexanediol, 1,7-heptanediol, glycerol, 1,1,1-trimethylolpropane, 1,1,1-trimethylolethane, 1,2,6-hexanetriol, α-methyl glucoside, pentaerythritol, and sorbitol. Also included within the term "polyhydric alcohol" are compounds derived from phenol such as 2,2-bis(4-hydroxyphenyl)-propane, commonly known as Bisphenol A.

The hydroxyl-containing polyester may also be a polyester amide such as is obtained by including some amine or amino alcohol in the reactants for the preparation of the polyesters. Thus, polyester amides may be obtained by condensing an amino alcohol such as ethanolamine with the polycarboxylic acids set forth above or they may be made using the same components that make up the hydroxyl-containing polyester with only a portion of the components being a diamine such as ethylene diamine.

Any suitable polyoxyalkylene polyether polyol may be used such as the polymerization product of an alkylene oxide or a mixture of alkylene oxides with a polyhydric alcohol. Any suitable polyhydric alcohol may be used such as those disclosed above for use in the preparation of the hydroxy-terminated polyesters. Any suitable alkylene oxide may be used such as ethylene oxide, propylene oxide, butylene oxide, amylene oxide, and mixtures of these oxides. The polyoxyalkylene polyether polyols may be prepared from other starting materials such as tetrahydrofuran and alkylene oxide-tetrahydrofuran mixtures; epihalohydrins such as epichlorohydrin; as well as aralkylene oxides such as styrene oxide. The polyoxyalkylene polyether polyols may have either primary or secondary hydroxyl groups. Included among the polyether polyols are polyoxyethylene glycol, polyoxypropylene glycol, polyoxybutylene glycol, polytetramethylene glycol, block copolymers, for example, combinations of polyoxypropylene and polyoxyethylene glycols, poly-1,2-oxybutylene and polyoxyethylene glycols, poly-1,4-oxybutylene and polyoxyethylene glycols, and random copolymer glycols prepared from blends of two or more alkylene oxides or by the sequential addition of two or more alkylene oxides. The polyoxyalkylene polyether polyols may be prepared by any known process such as, for example, the process disclosed by Wurtz in 1859 and *Encyclopedia of Chemical Technology*, vol. 7, pp. 257-262, published by Interscience Publishers, Inc. (1951) or in U.S. Pat. No. 1,922,459. Polyethers which are preferred include the alkylene oxide addition products of trimethylolpropane, glycerine, pentaerythritol, sucrose, sorbitol, propylene glycol, and 2,2'-(4,4'-hydroxyphenyl)propane and blends thereof having equivalent weights of from 500 to 10,000.

Suitable polyhydric polythioethers which may be condensed with alkylene oxides include the condensation product of thiodiglycol or the reaction product of a dicarboxylic acid such as is disclosed above for the preparation of the hydroxyl-containing polyesters with any other suitable thioether glycol.

Polyhydroxyl-containing phosphorus compounds which may be used include those compounds disclosed in U.S. Pat. No. 3,639,542. Preferred polyhydroxyl-containing phosphorus compounds are prepared from alkylene oxides and acids of phosphorus having a $P_2O_5$ equivalency of from about 72 percent to about 95 percent.

Suitable polyacetals which may be condensed with alkylene oxides include the reaction product of formaldehyde or other suitable aldehyde with a dihydric alcohol or an alkylene oxide such as those disclosed above.

Suitable aliphatic thiols which may be condensed with alkylene oxides include alkanethiols containing one or two —SH groups such as 2-mercaptoethanol, 1,2-ethanedithiol, 1,2-propanedithiol, 1,3-propanedithiol, and 1,6-hexanedithiol; alkene thiols such as 2-butene-1,4-dithiol; and alkyne thiols such as 3-hexyne-1,6-dithiol.

Suitable amines which may be condensed with alkylene oxides include aromatic amines such as aniline, o-chloroaniline, p-phenylenediamine, m-phenylenediamine, o-phenylenediamine, 1,5-diaminonaphthalene, methylene dianiline, the condensation products of aniline and formaldehyde, and 2,3- 2,6-, 3,4-, 2,5-, and 2,4-diaminotoluene; aliphatic amines such as methylamine, triisopropanolamine, ethylenediamine, 1,3-diaminopropane, 1,3-diaminobutane, 1,4-diaminobutane, and ammonia.

Other polyols which may be employed are graft polymer dispersions in either saturated or unsaturated polyoxyalkylene polyether polyols, such as described in U.S. Pat. Nos. 3,931,092; 4,014,846; 4,093,573; and 4,122,056, the disclosures of which are hereby incorporated by reference. Preferred are the graft polymer dispersions prepared employing unsaturated polyols. These are prepared by conducting the in situ polymerization of an ethylenically unsaturated monomer or mixture of monomers in the presence of a free-radical initiator in an unsaturated polyol mixture containing less than 0.1 mole of unsaturation per mole of polyol mixture. The polyol mixture employs as part of the mixture a polyether-ester polyol prepared by the reaction of a polyoxyalkylene polyether polyol with maleic anhydride and capped with an alkylene oxide. This polyether-ester polyol is than isomerized by methods well known to those skilled in the art. Specific details for the preparation of the polyether-ester polyol are found in U.S. Pat. No. 4,550,194 the disclosure of which is incorporated by reference.

Chain transfer agents are preferentially employed as reaction moderators for the polymerization of the ethylenically unsaturated monomers. The polymerization reaction may be carried out at temperatures between 25° C. and 180° C., preferably between 80° C. and 135° C. The polyol mixture contains less than 0.1 mole of unsaturation per mole of polyol mixture and preferably ranges from 0.001 to 0.09 mole of unsaturation per mole of polyol.

Among those reaction moderators which may be employed are as follows: acetic acid, bromoacetic acid, chloroacetic acid, ethyl dibromoacetate, iodoacetic acid, tribromoacetic acid, ethyl tribromoacetate, trichloroacetic acid, ethyl trichloroacetate, acetone, p-bromophenylacetonitrile, p-nitrophenylacetylene, allyl alcohol, 2,4,6-trinitroaniline, p-ethynylanisole, 2,4,6-trinitroanisole, azobenzene, benzaldehyde, p-cyanobenzaldehyde, 2-butylbenzene, bromobenzene, 1,3,5-trinitrobenzene, benzochrysene, ethyl trinitrobenzoate, benzoin, benzonitrile, benzopyrene, tributylborane, 1,4-butanediol, 3,4-epoxy-2-methyl-1-butene, t-butyl ether, t-butyl isocyanide, 1-phenylbutyne, p-cresol, p-bromocumene, dibenzonaphthacene, p-dioxane, pentaphenyl ethane, ethanol, 1,1-diphenylethylene, ethylene glycol, ethyl ether, fluorene, N,N-dimethylformamide, 2-heptene, 2-hexene, isobutyraldehyde, diethyl bromomalonate, bromotrichloromethane, dibromoethane, diiodomethane, naphthalene, 1-naphthol, 2-naphthol, methyl oleate, 2,4,4-triphenyl-1-pentene, 4-methyl-2-pentene, 2,6-diisopropylphenol, phenyl ether, phenylphosphine, diethylphosphine, dibutylphosphine, phosphorus trichloride, 1,1,1-tribromopropane, dialkyl phthalate, 1,2-propanediol, 3-phosphinopropionitrile, propanol, pyrocatechol, pyrogallol, methyl stearate, tetraethylsilane, triethylsilane, dibromostilbene, α-bromostyrene, α-methylstyrene, tetraphenyl succinonitrile, 2,4,6-trinitrotoluene, p-toluidine, N,N-dimethylp-toluidine, m-cyano-p-tolunitrile, α,α'-dibromo-p-xylene, 2,6-xylenol, diethyl zinc, dithiodiacetic acid, ethyl dithiodiacetic acid, 4,4'-dithio-bisanthranilic acid, benzenethiol, o-ethoxybenzenethiol, 2,2'-dithiobisbenzothiazole, benzyl sulfide, 1-dodecanethiol, ethanethiol, 1-hexanethiol, 1-naphthalenethiol, 2-naphthalenethiol, 1-octanethiol, 1-heptanethiol, 2-octanethiol, 1-tetradecanethiol, α-toluenethiol, isopropanol, 2-butanol, toluene, bromochloromethane, 1-butanol, carbon tetrachloride, 2-mercaptoethanol, octadecyl mercaptan, carbon tetrabromide and tertiary dodecyl mercaptan.

The reaction moderators employed will depend on the particular monomers or mixtures of monomers employed and the molar ratios of such mixtures. The concentration of the reaction moderator is that amount which is effective and may range from 0.1 to 10 percent by weight based on the weight of monomer, preferably from 0.5 to 2.0 weight percent based on the weight of monomer.

The unsaturated polyols or macromers which are employed in the present invention may be prepared by the reaction of any conventional polyol such as those described above with a compound selected from the group consisting of maleic acid, maleic anhydride and fumaric acid. Thereafter the unsaturated polyol may be reacted with an alkylene oxide, preferably ethylene or propylene oxide, to replace the carboxyl groups with hydroxyl groups prior to employment in the present invention. The amount of alkylene oxide employed is such as to reduce the acid number of the unsaturated polyol to about 5 or less.

The alkylene oxides which may be employed for the preparation of the polyetherester polyols include ethylene oxide, propylene oxide, butylene oxide, amylene oxide and mixtures of these oxides, preferably ethylene and propylene oxide.

The maleated macromers are preferably isomerized at temperatures ranging from 80° C. to 120° C. for one-half hour to three hours in the presence of an effective amount of an isomerization catalyst. The catalyst is employed at concentrations greater than 0.01 weight percent based on the weight of the macromer and may be as high as 5.0 weight percent.

When preparing the polyetherester polyol employing the catalyst selected from the group consisting of salts and oxides of divalent metals, the concentration of catalyst which may be employed ranges from 0.01 to 0.5 weight percent based on the weight of polyol mixture. The temperatures employed range from 75° C. to 175° C. The equivalent weight of the polyol employed to prepare the macromer may vary from 1000 to 10,000, preferably from 2000 to 6000.

Among the divalent metals which may be employed are: zinc acetate, zinc chloride, zinc oxide, zinc neodecanoate, tin chloride, calcium naphthenate, calcium chloride, calcium oxide, calcium acetate, copper naphthenate, cadmium acetate, cadmium chloride, nickel chloride, manganese chloride, and manganese acetate.

Certain of the above-mentioned catalysts such as calcium naphthenate promote the isomerization of the maleate to the fumarate structure during the preparation of the macromer, while others such as zinc chloride, which is an effective catalyst for the esterification, inhibit this isomerization.

The macromer unsaturation ranges from 0.1 mole to 1.5 mole of unsaturation per mole of polyol and, preferably, from 0.5 to 1.0 mole of unsaturation per mole of polyol.

As mentioned above, the graft polymer dispersions of the invention are prepared by the in situ polymerization, in the above-described polyols of an ethylenically unsaturated monomer or a mixture of ethylenically unsaturated monomers. Representative ethylenically unsaturated monomers which may be employed in the present invention include butadiene, isoprene, 1,4-pentadiene, 1,6-hexadiene, norbornadiene, 1,7-octadiene, styrene, α-methylstyrene, 2-methylstyrene, 3-methylstyrene and 4-methylstyrene, 2,4-dimethylstyrene, ethylstyrene, isopropylstyrene, butyl-styrene, phenylstyrene, cyclohexylstyrene, benzylstyrene, and the like; substituted styrenes such as cyanostyrene, nitrostyrene, N,N-dimethylaminostyrene, acetoxystyrene, methyl 4-vinylbenzoate, phenoxystyrene, p-vinylphenyl oxide, and the like; the acrylic and substituted acrylic monomers such as acrylonitrile, acrylic acid, methacrylic acid, methyl acrylate, 2-hydroxyethyl acrylate, methyl methacrylate, cyclohexyl methacrylate, benzyl methacrylate, isopropyl methacrylate, octyl methacrylate, methacrylonitrile, ethyl α-ethoxyacrylate, methyl α-acetaminoacrylate, butyl acrylate, 2-ethylhexyl acrylate, phenyl acrylate, phenyl methacrylate, N,N-dimethylacrylamide, N,N-dibenzylacrylamide, N-butylacrylamide, methacrylyl formamide, and the like; the vinyl esters, vinyl ethers, vinyl ketones, etc., such as vinyl acetate, vinyl butyrate, isopropenyl acetate, vinyl formate, vinyl acrylate, vinyl methacrylate, vinyl methoxyacetate, vinyl benzoate, vinyltoluene, vinyl-naphthalene, vinyl methyl ether, vinyl ethyl ether, vinyl propyl ethers, vinyl butyl ethers, vinyl 2-ethylhexyl ether, vinyl phenyl ether, vinyl 2-methoxyethyl ether, methoxybutadiene, vinyl 2-butoxyethyl ether, 3,4-dihydro-1,2-pyran, 2-butoxy-2'-vinyloxy diethyl ether, vinyl methyl ketone, vinyl ethyl ketone, vinyl phosphonates such as vinyl phenyl ketone, n-vinyl carbazole, vinyl ethyl sulfone, N-methyl-N-vinyl acetamide, N-vinylpyrrolidone, vinyl imidazole, divinyl benzene, divinyl sulfoxide, divinyl sulfone, sodium vinylsulfonate, methyl vinylsulfonate, N-vinyl pyrrole, and the like; dimethyl fumarate, dimethyl maleate, maleic acid, crotonic acid, fumaric acid, itaconic acid, monomethyl itaconate, t-butylaminoethyl methacrylate, dimethylaminoethyl methacrylate, glycidyl acrylate, allyl alcohol, glycol monoesters of itaconic acid, vinyl pyridine, and the like, and mixtures thereof. Any of the known polymerizable monomers can be used and the compounds listed above are illustrative and not restrictive of the monomers suitable for use in this invention. Preferably, the monomer is styrene or acrylonitrile styrene.

The amount of ethylenically unsaturated monomer employed in the polymerization reaction is generally from 25 percent to 75 percent, preferably from 30 percent to 50 percent, based on the total weight of the dispersion. The polymerization occurs at a temperature between about 25° C. and 180° C., preferably from 80° C. to 135° C.

Illustrative polymerization initiators which may be employed are the well-known free radical types of vinyl polymerization initiators such as the peroxides, persulfates, perborates, percarbonates, azo compounds, etc. These include hydrogen peroxide, dibenzoyl peroxide, acetyl peroxide, benzoyl hydroperoxide, t-butyl hydroperoxide, di-t-butyl peroxide, lauroyl peroxide, butyryl peroxide, diisopropylbenzene hydroperoxide, cumene hydroperoxide, paramenthane hydroperoxide, diacetyl peroxide, di-α-cumyl peroxide, dipropyl peroxide, diisopropyl peroxide, isopropyl-t-butyl peroxide, butyl-t-butyl peroxide, difuroyl peroxide, bis(triphenylmethyl) peroxide, bis(p-methoxybenzoyl) peroxide, p-monomethoxybenzoyl peroxide, rubene peroxide, ascaridol, t-butyl peroxybenzoate, diethyl peroxyterephthalate, propyl hydroperoxide, isopropyl hydroperoxide, n-butyl hydroperoxide, t-butyl hydroperoxide, cyclohexyl hydroperoxide, trans-decalin hydroperoxide,α-methylbenzyl hydroperoxide, α-methyl-α-ethyl benzyl hydroperoxide, tetralin hydroperoxide, triphenylmethyl hydroperoxide, diphenylmethyl hydroperoxide, α,α'-azobis-(2methyl heptonitrile), 1,1'-azo-bis(cyclohexane carbo-nitrile), 4,4'-azobis(4-cyanopentanoic acid), 2,2'-azobis(isobutyronitrile), 1-t-butylazo-1-cyanocyclohexane, persuccinic acid, diisopropyl peroxy dicarbonate, 2,2'-azobis(2,4-dimethylvaleronitrile), 2-t-butylazo-2-cyano-4methoxy-4-methylpentane,2,2'-azobis-2-methylbutanenitrile, 2-t-butylazo-2-cyanobutane, 1-t-amylazo-1-cyanocyclohexane, 2,2'-azobis(2,4-dimethyl-4-methoxyvaleronitrile), 2-t-butylazo-2-cyano-4-methylpentane, 2-t-butylazo-2-isobutyronitrile, butylperoxyisopropyl carbonate and the like; a mixture of initiators may also be used. The preferred initiators are 2,2'-azobis(2-methylbutanenitrile), 2,2'-azobis-(isobutyronitrile), 2,2'-azobis(2,4-dimethylvaleronitrile), 2-t-butylazo-2-cyano-4-methoxy-4-methylpentane, 2-t-butylazo-2-cyano-4-methylpentane, and 2-t-butylazo-2-cyanobutane. Generally, from about 0.01 percent to about 5 percent, preferably from about 0.5 percent to about 1.5 percent, by weight of initiator based on the weight of the monomer will be employed in the process of the invention.

The graft polymer dispersions of this invention have useful viscosities less than 10,000 cps at 25° C. Preferably they have viscosities ranging from 2000 to 8000 cps at 25° C.

Also, polyols containing ester groups can be employed in the subject invention. These polyols are prepared by the reaction of an alkylene oxide with an organic dicarboxylic acid anhydride and a compound containing reactive hydrogen atoms. A more comprehensive discussion of these polyols and their method of preparation can be found in U.S. Pat. Nos. 3,585,185; 3,639,541 and 3,639,542.

The polyurethane foams employed in the present invention are generally prepared by the reaction of a polyoxyalkylene polyether polyol with an organic polyisocyanate in the presence of a blowing agent and optionally in the presence of additional polyhydroxyl-containing components, chain-extending agents, catalysts, surface-active agents, stabilizers, dyes, fillers and pigments. Suitable processes for the preparation of cellular polyurethane foams are disclosed in U.S. Reissue Pat. No. 24,514 together with suitable machinery to be used in conjunction therewith. It is possible to proceed with the preparation of the polyurethane foams by a prepolymer technique wherein an excess of organic polyisocyanate is reacted in a first step with the polyol of the present invention to prepare a prepolymer having free isocyanate groups which is then reacted in a second step with water and/or additional polyol to prepare a foam. Alternatively, the components may be reacted in a single working step commonly known as the "one-shot" technique of preparing polyurethanes.

Organic polyisocyanates which may be employed include aromatic, aliphatic, and cycloaliphatic polyisocyanates and combinations thereof. Representative of these types are the diisocyanates such as m-phenylene diisocyanate, 2,4-toluene diisocyanate, 2,6-toluene diisocyanate, mixtures of 2,4- and 2,6-toluene diisocyanate, hexamethylene diisocyanate, tetramethylene diisocyanate, cyclohexane-1,4-diisocyanate, hexahydrotoluene diisocyanate (and isomers), naphthalene-1,5-diisocyanate, 1-methoxyphenyl-2,4-diisocyanate, 4,4'-diphenylmethane diisocyanate, 4,4'-biphenylene diisocyanate, 3,3'-dimethoxy-4,4'-biphenyl diisocyanate, 3,3'-dimethyl-4,4'-biphenyl diisocyanate and 3,3'-dimethyldiphenylmethane-4,4'-diisocyanate; the triisocyanates such as 4,4',4"-triphenylmethane triisocyanate, and toluene 2,4,6-triisocyanate; and the tetraisocyanates such as 4,4'-dimethyldiphenylmethane-2,2'-5,5'-tetraisocyanate and polymeric polyisocyanates such as polymethylene polyphenylene polyisocyanate. The isocyanate index ranges from 80–140, preferably 90–110, more preferably 100–105. As the index increases, the viscosity of the molten foam tends to increase as does the char formation.

Crude polyisocyanates may also be used in the compositions of the present invention, such as crude toluene diisocyanate obtained by the phosgenation of a mixture of toluene diamines or crude diphenylmethane diisocyanate obtained by the phosgenation of crude diphenylmethane diamine.

The polyoxyalkylene polyether polyols may be employed along with another polyhydroxyl-containing component commonly employed in the art. Any of the polyhydroxyl-containing components which are described above for use in the preparation of the polyols may be employed in the preparation of the polyurethane foams useful in the present invention.

The blowing agents which can be employed in this invention include water, liquified gases which have boiling points below 28° C. and above −60° C. and which vaporize at or below the temperature of the foaming mass, or other inert gases such as nitrogen, carbon dioxide, helium and argon. If water is added as the blowing agent, corresponding quantities of excess isocyanate to react with the water and produce carbon dioxide may be used. An increase in the amount of water tends to improve char formation and increase the molten foam viscosity. Suitable liquified gases include fluorinated, partially fluorinated, or halogenated compounds having from 1 to 5, preferably 1–3 carbon atoms; or alkanes or cycloalkanes having 4 to 10, preferably about 4 to 8 carbon atoms. Among these, CFC-11, CFC-113, CFC-114, CFC-123, CFC-123a, CFC-124, CFC-124a, CFC-133 (all isomers), CFC-134, CFC-134a, CFC-141b, CFC-142, CFC-151, 1,1,1-trichloroethane, butane, pentane, cyclopentane, heptane, hexane, perhalogenated propanes and the like are suitable. Similar alkanes containing bromine atoms are also useful. Among those listed, the "soft" CFC's (those having at least one hydrogen atom) are preferred. CFC-123, CFC-141b, and CFC-142 are especially preferred. Alkenes such as pentene and heptene are also useful. Other blowing agents such as azohexahydrobenzodinitrile may be employed. Any of the above blowing agents may be mixed. The amount of blowing agent will vary the density of the foam, but generally, 1 to 20 weight, preferably about 2 to about 5 weight percent of blowing agent based on the weight of the polyol composition will yield adequately blown foams.

Chain-extending agents which may optionally be employed in the preparation of the polyurethane foams include those compounds having at least two functional groups bearing active hydrogen atoms such as water, hydrazine, primary and secondary diamines, amino alcohols, amino acids, hydroxy acids, glycols, or mixtures thereof. A preferred group of chain-extending agents includes water, ethylene glycol, 1,4-butanediol and primary and secondary diamines which react more readily with the prepolymer than does water such as phenylene diamine, 1,4-cyclohexane-bis-(methylamine), ethylenediamine, diethylenetriamine, N-(2-hydroxypropyl)ethylenediamine, N,N'-di(2-hydroxypropyl)ethylenediamine, piperazine, and 2-methylpiperazine.

Optional flame retardant compounds which may be employed in addition to the silicone polymer drip preventatives described above are tetrakis(2-chloroethyl) ethylene phosphonate, pentabromodiphenyl oxide, tris(1,3-dichloropropyl) phosphate, tris(beta-chloroethyl) phosphate, molybdenum trioxide, ammonium molybdate, ammonium phosphate, pentabromodiphenyloxide, tricresyl phosphate, 2,3-dibromopropanol, hexabromocyclododecane, dibromoethyldibromocyclohexane, tris(2,3-dibromopropyl)phosphate, tris(beta-chloropropyl)phosphate, and melamine.

Any suitable catalyst may be used including tertiary amines such as, for example, triethylenediamine, N-methylmorpholine, N-ethylmorpholine, diethylethanolamine, N-cocomorpholine, 1-methyl-4-dimethylaminoethylpiperazine, 3-methoxypropyldimethylamine, N,N,N'-trimethylisopropyl propylenediamine, 3-diethylaminopropyldiethylamine, di-methylbenzylamine, and the like. Other suitable catalysts are, for example, stannous chloride, dibutyltin di-2-ethyl hexanoate, stannous oxide, as well as other organometallic compounds such as are disclosed in U.S. Pat. No. 2,846,408.

To produce a stable foam which does not collapse or contain large uneven cells, a surfactant may be used to stabilize the foam. Suitable surfactants include non-ionic surface active agents such as polysiloxane polyoxyalkalene copolymers described in U.S. Pat. Nos. 3,887,500 and 3,957,842; hydroxy terminated polyoxyalkylene pendant groups attached to a polydialkylsiloxane chain as described in U.S. Pat. Nos. 4,746,683 and 4,769,174; a tertiary alcohol-modified siloxane modified polymer as in U.S. Pat. No. 4,039,490; and others such as polyethylene glycol ethers of long chain alcohols, tertiary amine or alkanolamine salts of long chain alkyl of long chain alkyl acid sulfate esters, alkyl sulfonic esters and alkyl arylsulfonic acids.

The following examples illustrate the nature of the invention. All are weight percent unless otherwise stated.

Polyol A is a trimethylolpropane initiated propylene oxide ethylene oxide adduct containing 15 percent ethylene oxide and having a theoretical hydroxyl number 25.

Polyol B is a sucrose propylene glycol initiated propylene oxide adduct having a theoretical hydroxyl number of 570.

Polyol C is a trimethylolpropane initiated propylene oxide ethylene oxide adduct containing 13 percent ethylene oxide and a theoretical hydroxyl number of 35.

Polyol D is a graft polymer dispersion of Polyol C having a 30 weight percent solids content of a 1:1 acrylonitrile: styrene commercially available from BASF Corporation, Wyandotte, Mich. as PLURACOL® 973 polyol.

Polyol E is a graft polyol blend of Polyol C containing 23 percent by weight Polyol D.

Polyol F is a glycerine propylene glycol initiated propylene oxide adduct having a theoretical hydroxyl number of 57.

Polyol G is a propylene glycol initiated propylene oxide adduct having a theoretical hydroxyl number of 260.

Isocyanate A is a diphenylmethane diisocyanate (MDI) containing 49 percent by weight 4,4'-MDI, 50 percent by weight 2,4'-MDI, and 1 percent by weight 2,2'-MDI having an NCO content of 33.5 percent.

Isocyanate B is an MDI containing 98 percent by weight 4,4'-MDI and 2 percent by weight 2,4'-MDI, and having an NCO content of 33.5 percent.

Isocyanate C is a polymethylene polyphenylisocyanate with a functionality of about 2.78 and an NCO content of 31.5 percent.

Silicone 5307 is a silicone surfactant manufactured by Dow Corning Corporation.

Dabco 33 LV is a 33 percent solution of triethylene diamine in dipropylene glycol.

Niax A-1 is an amine catalyst manufactured by Union Carbide Corporation.

Freon-11 is monofluorotrichloromethane.

DPG is dipropylene glycol.

PREPARATION OF THE PREPOLYMER

All parts herein are a weight percentage based on the weight of all ingredients in the prepolymer. A round bottom flask is charged with 37.55 weight percent Isocyanate B, 24 weight percent Isocyanate C, and 20.1 weight percent Isocyanate A, and heated to 60° C. Next, a mixture of 1.6 weight percent DPG, 0.96 weight percent Polyol G, and 15.79 weight percent Polyol F are charged at a constant rate, to the flask containing isocyanate for one hour while mixing and maintaining the temperature between 60° C. and 80° C. The ingredients are allowed to react for 2 hours at 80° C. under constant mixing. The prepolymer had an NCO content of 24.74 percent.

Procedure

The flexible polyurethane foams were prepared by charging five open quart containers with the indicated quantities of ingredients listed on Table I. Each open quart contained a different drip retardant, either GP-4, GP-6, EXP-68, Comparative Polyol B, or a normal without any additive:

TABLE I

| Ingredients | A | B | C | Comp. D | Normal E |
|---|---|---|---|---|---|
| Resin | | | | | |
| Polyol A | 77.867 | 77.867 | 77.867 | 77.867 | 78.587 |
| EXP-68 | .916 | — | — | — | — |
| GP-4 | — | .916 | — | — | — |
| GP-6 | — | — | .916 | — | — |
| Polyol B | — | — | — | .916 | — |
| Water | 2.565 | 2.565 | 2.565 | 2.565 | 2.589 |
| Polyol E | 13.742 | 13.742 | 13.742 | 13.742 | 13.869 |
| Dabco 33-LV | 1.053 | 1.053 | 1.053 | 1.053 | 1.063 |
| Niax A-1 | 0.037 | 0.037 | 0.037 | 0.037 | 0.037 |
| Freon-11 | 3.628 | 3.628 | 3.628 | 3.628 | 3.661 |
| L-5307 | 0.192 | 0.192 | 0.192 | 0.192 | 0.194 |
| Total | 100 | 100 | 100 | 100 | 100 |
| Prepolymer (100 Index) | 57.75 | 57.75 | 57.75 | 57.75 | 57.75 |
| Density | 3.08 | 2.87 | 2.88 | 3.33 | 3.53 |

The composition ingredients were added to the cups in the following observed order by the indicated weight percent in Table I:

Polyol A and the respective drip preventative were blended in the quart cup until homogeneous; to this blend was added water, then Polyol E, then DABCO-33LV, then NIAX A-1, the Freon-11, and finally L-5307 under continuous mixing until a homogeneous mixture was obtained. To each of the five batches in quart cups was added the prepolymer at a ratio of polyol resin to isocyanate prepolymer of 100:57.75, mixed for about six seconds, and allowed to rise freely.

An 8 cubic centimeter foam cube was cut from each of the cups and tested for dripping and char formation by placing the foam cube on a wire screen over a bunsen burner so that twenty-five percent of the cube was directly in the flame until completely combusted.

Cube A with EXP-68 exhibited no dripping throughout the burn and resulted in good char formation. Cube B with GP-4 exhibited no dripping throughout the burn and good char formation. Cube C with GP-6 released five drops of the foam at the start of the burn and thereafter was drip free, and resulted in good char formation. Cube D with Polyol B and Cube E with no additive each released flaming drops throughout the burn with little char formation.

The results indicate that less than 1 weight percent based on the weight of the resin resulted in the substantial, if not complete, elimination of dripping action by the foam during a burn with a concomitant formation of char.

On a comparative scale, the viscosity of the foam when molten during the burn tests, from greatest to least, followed the pattern: EXP-68 > GP-4 > GP-6 > P-240 and Control. The char formation followed the same pattern.

I claim:

1. A process for the preparation of a drip retardant flexible polyurethane foam obtained by reacting a polyol composition comprising:
   a) a polyol;
   b) a drip retardant;
   c) a blowing agent;
   d) a urethane promoting catalyst; and optionally
   e) a surfactant, a chain extender, and/or a flame retardant with an organic polyisocyanate, said drip retardant having the formula:

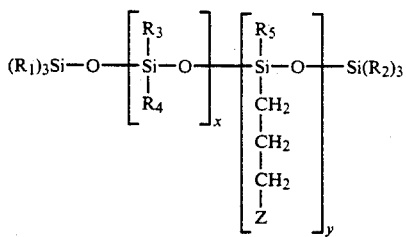

wherein $R_1$, $R_2$, $R_3$, $R_4$, and $R_5$ are each selected from the group consisting of alkyl radicals having 1–4 carbon atoms and aryl radicals; Z is selected from the group consisting of OH and $NH_2$; x is from 10 to 200; and y is from 2 to 50.

2. The process of claim 1, wherein the polyol and the drip retardant are homogeneously blended prior to adding the blowing agent, catalysts, and the optionally ingredients (e).

3. The process of claim 1, wherein the amount of drip retardant is from 0.5 weight percent to 5 weight percent based on the weight of the polyol composition.

4. The process of claim 3, wherein said amount of drip retardant ranges from 0.5 weight percent to about 1 weight percent.

5. The process of claim 1, wherein each R group is methyl, Z is OH, x is 56, and y is 8.

6. The process of claim 1, wherein each R group is methyl, Z is $NH_2$, x is 58 and y is 4.

7. The process of claim 1, wherein each R group is methyl, Z is $NH_2$, x is 100 and y is 4.

* * * * *